Oct. 19, 1965    B. W. COLBURN    3,212,551
VEHICLE WHEEL CONSTRUCTION
Filed Nov. 13, 1963    2 Sheets-Sheet 1
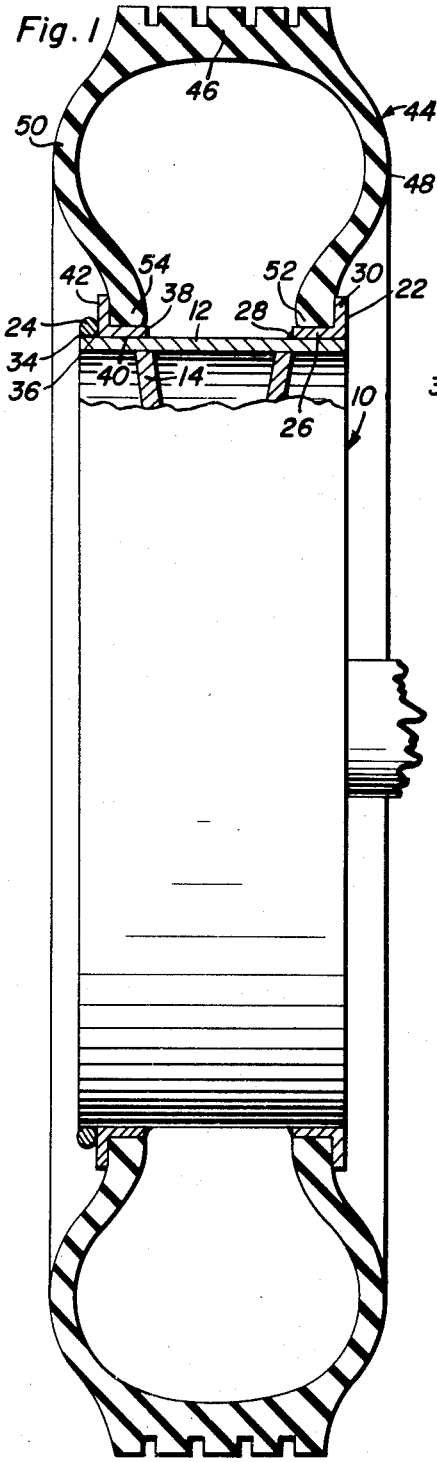
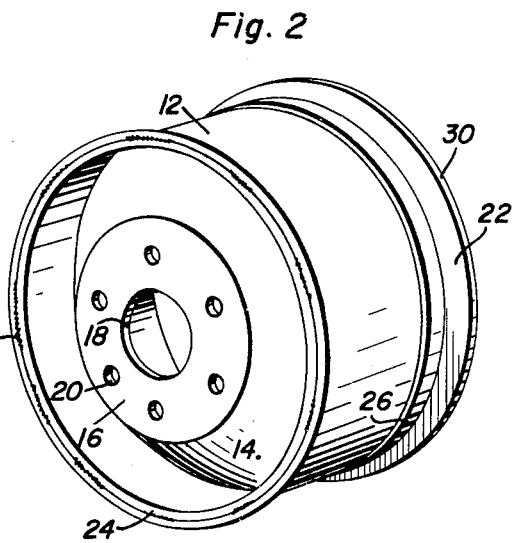
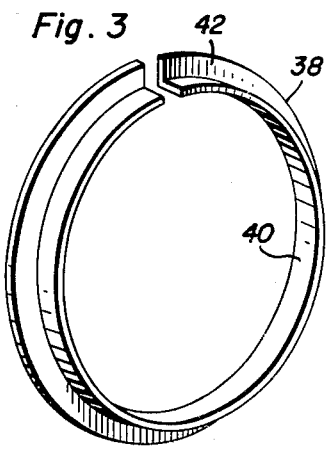
Ben W. Colburn
INVENTOR.
BY *[signatures]*
Attorneys Oct. 19, 1965  B. W. COLBURN  3,212,551

VEHICLE WHEEL CONSTRUCTION

Filed Nov. 13, 1963  2 Sheets-Sheet 2

Ben W. Colburn
INVENTOR.

United States Patent Office 3,212,551
Patented Oct. 19, 1965

3,212,551
VEHICLE WHEEL CONSTRUCTION
Ben W. Colburn, Lindsay, Calif.
(520 S. K St., Tulare, Calif.)
Filed Nov. 13, 1963, Ser. No. 323,286
2 Claims. (Cl. 152—406)

This invention relates to a novel and useful vehicle wheel construction and more specifically to a vehicle wheel construction designed in a manner whereby it may be readily manufactured at a low cost and with little difficulty using any one of a large number of suitable materials for its construction.

The vehicle wheel construction of the instant invention is further constructed in a manner whereby the tire casing thereon may be readily dismounted and again used without requiring special servicing to either the tire casing or the wheel construction.

Still further, the vehicle wheel construction of the instant invention is designed in a manner whereby the principles of its construction may be utilized whether the wheel construction is to be manufactured as a single wheel or as a dual wheel.

The main object of this invention is to provide a novel vehicle wheel construction which may be readily manufactured at a low cost and with a minimum amount of effort.

A further object of this invention, in accordance with the immediately preceding objects, is to provide a vehicle wheel construction which will be very sturdy in design and which is constructed in a manner whereby the tire casing mounted thereon may be readily removed and/or replaced with a minimum amount of effort.

Another object of this invention is to provide a vehicle wheel construction designed in a manner whereby conventional articles of manufacture such as disks and cylinders may be utilized in its manufacture thereby maintaining the cost of manufacturing the vehicle wheel at a minimum.

A final object of this invention to be specifically enumerated herein is to provide a vehicle wheel construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the vehicle wheel of the instant invention shown with portions thereof being broken away and in section and with a conventional form of vehicle tire casing mounted thereon;

FIGURE 2 is a perspective view of the vehicle wheel construction with the removable split retaining flange removed;

FIGURE 3 is a perspective view of the removable retaining flange of the wheel assembly;

Figure 4:
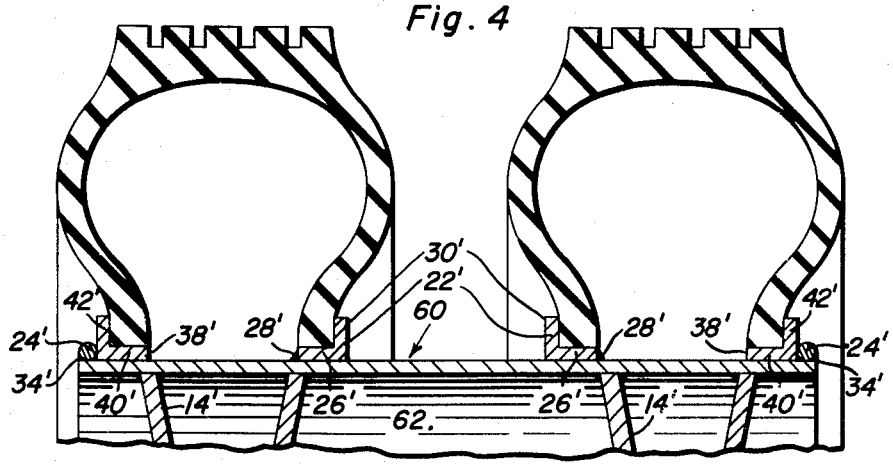
FIGURE 4 is a fragmentary longitudinal vertical sectional view taken substantially upon a plane passing through the longitudinal center line of a modified form of vehicle wheel construction defining a dual wheel assembly.

Referring now more specifically to the drawings the numeral 10 generally designates the vehicle wheel of the instant invention. The vehicle wheel 10 comprises a generally cylindrical body 12 and a web assembly 14 which supports a hub portion 16 suitably apertured as at 18 and 20 for securement to a vehicle brake drum in the conventional manner.

The vehicle wheel 10 includes a first radially outwardly projecting circumferential abutment flange 22 on one end of the cylindrical body 12 and a second radially outwardly projecting circumferential abutment flange 24 on the other end of the cylindrical body. The first circumferential abutment flange includes a generally cylindrical base portion 26 which snugly embraces the cylindrical body 12 and is fixedly secured thereto in any convenient manner such as by means of welding 28. The outermost end of the base portion 26 includes an integral annular flange portion 30 which projects radially outwardly thereof. The second circumferential abutment flange 24 comprises a continuous ring of rod-like material which is secured to the end of the cylindrical body 12 remote from the abutment flange 22 in any convenient manner such as by welding 34. The welding 34 is confined to the outer portion of the rod-like ring and thereby enables an annular pocket 36 to be formed by the intersecting surfaces of the inner surfaces of the ring 24 and the cylindrical body 12.

The vehicle wheel 10 includes an annular abutment member 38 which is substantially identical to the annular flange 22 with the exception that it is split along a radius thereof. The abutment member 38 includes a generally cylindrical base portion 40 which is radially split and an integral split annular flange portion 42. From FIGURE 1 of the drawings it may be seen that a conventional form of tire casing 44 including a tread or crown portion 46 and a pair of generally annular opposite side walls 48 and 50 terminating at their inner peripheral portions in bead portions 52 and 54 respectively is disposed between the annular flange portions 30 and 42 with the remote surfaces of the bead portion 52 and 54 thereof abutting against the confronting surfaces of the flange portions 30 and 42. Further, it will be seen that the bead portions 52 and 54 snugly embrace the cylindrical base portions 26 and 40. In this manner, it may be seen that higher air pressure within the tire casing 44 will cause an outward force to be applied to the bead portions 52 and 54 whereby they will resist inward deflection from seating engagement with the flange portions 30 and 42 and the base portions 26 and 40.

In order to demount the tire casing 44, the latter is first deflated and then the side wall 50 and corresponding bead portion 54 is deflected inwardly toward the remote side wall of the tire casing 44. Then, the circumferentially expandible and split annular angle abutment member 38 may be expanded over the abutment flange 24. Thereafter, the bead portions 54 and 52 of the tire casing 44 may be sequentially slipped over the abutment flange 24 and from about the vehicle wheel 10.

As hereinbefore set forth, the abutment flange 24 is secured to the cylindrical body 12 by welding 34 restricted to the outer surface of the abutment flange 24 thereby enabling the pocket 36 to be formed between confronting surfaces of the split annular flange portion 42 and the abutment flange 24 and cylindrical body 12. This pocket 36 needs to be occasionally cleaned of foreign material but is provided in order that a positive seating engagement may be formed between the split annular flange portion 42 and the abutment flange 24 even though there may be some dirt or the like clinging to the outer surfaces of the cylindrical body 12 or the inner face of the abutment flange 24, this foreign material being receivable within the pocket 36 when the tire casing 44 is inflated.

It will be noted that the outside diameter of the abutment flange 24 is only slightly greater than the outside diameter of the base portions 26 and 40. In this manner, it may be seen that the bead portions 52 and 54 may be readily slipped over the abutment flange 24. In addition, the outside diameters of the base portions 26 and 40 are substantially identical so as to form partial seats for the bead portions 52 and 54 and inasmuch as the real construction is formed of a large diameter cylindrical body, disk-like web portions, rod-like annular members, and annular angle abutment members, the production cost thereof may be held to a minimum inasmuch as all of these components may be readily available and need not be specially manufactured.

Figure 5:
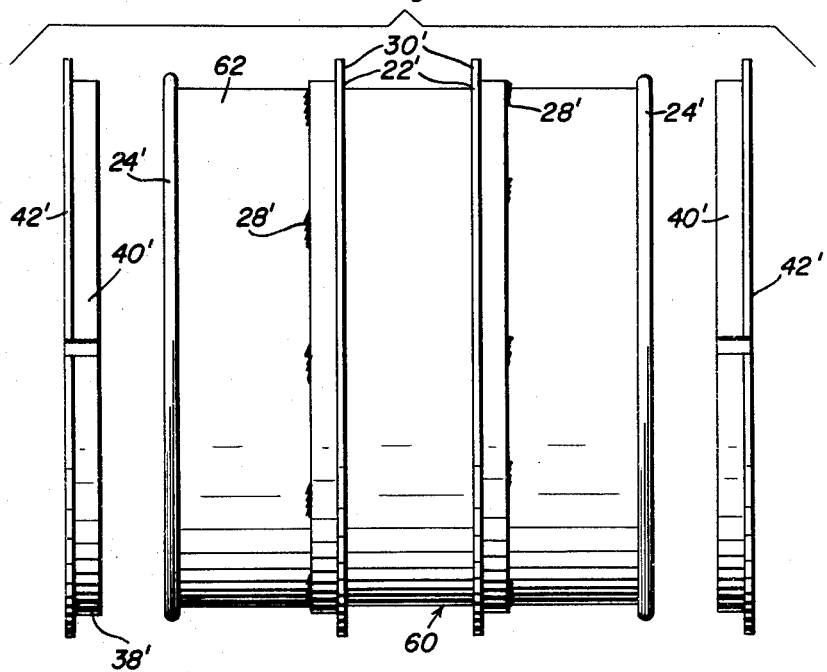
FIGURE 5 is a side elevational view of the dual wheel construction shown with the split retaining or abutment flanges thereof removed.

Referring now more specifically to FIGURES 4 and 5 of the drawings there may be seen a dual wheel assembly generally referred to by the reference numeral 60 which comprises an extra long cylindrical body 62 composed of two integrally formed cylindrical bodies of the vehicle wheel assembly. While the cylindrical body 62 is slightly longer than twice the length of two of the cylindrical body members 12, each half of the dual wheel assembly 16 is formed in a manner substantially identical to one of the vehicle wheel assemblies 10 and the component parts thereof have therefore been given prime reference numerals corresponding to the corresponding portions of the wheel assembly 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle wheel including a generally cylindrical body, a first annular abutment member secured about one end of said body and including a continuous generally cylindrical base portion snugly embracing and fixedly secured to said body, an integral continuous annular flange portion formed on the end portion of said base portion remote from the other end of said body and projecting radially outwardly of said base portion, ring means snugly embracing and fixedly secured about the other end of said body, a split second annular abutment member including a split generally cylindrical base portion disposed about said other end of said body inwardly of said ring, said split base portion including an integral split annular flange portion projecting generally radially outwardly of the end of said split base portion remote from said one end of said body, said second abutment member being expandable over said continuous ring and disposed with its annular flange portion abutting against said continuous ring whereby said cylindrical base portions project toward each other from the corresponding annular flange portions, the outer surfaces of said cylindrical base portion having substantially the same diameter and being adapted to be snugly embraced by the opposite bead portions of the side walls of the tire casing disposed on said body between said annular flange portions and of slightly less diameter than the outer diameter of said continuous ring, the outside diameter of the portions of said body intermediate the opposite ends of said generally cylindrical base portions being less than the outer diameter of the cylindrical base portion of the first abutment member.

2. The combination of claim 1 wherein said vehicle wheel comprises a dual wheel and includes a pair of said bodies integrally formed and with their one ends adjacent each other.

References Cited by the Examiner

UNITED STATES PATENTS 2,614,603 10/52 Howley.

FOREIGN PATENTS 567,043 12/32 Germany.
1,032,821 4/53 France.
823,341 11/59 Great Britain.

ARTHUR L. LA POINT, *Primary Examiner.*